Figure 1:
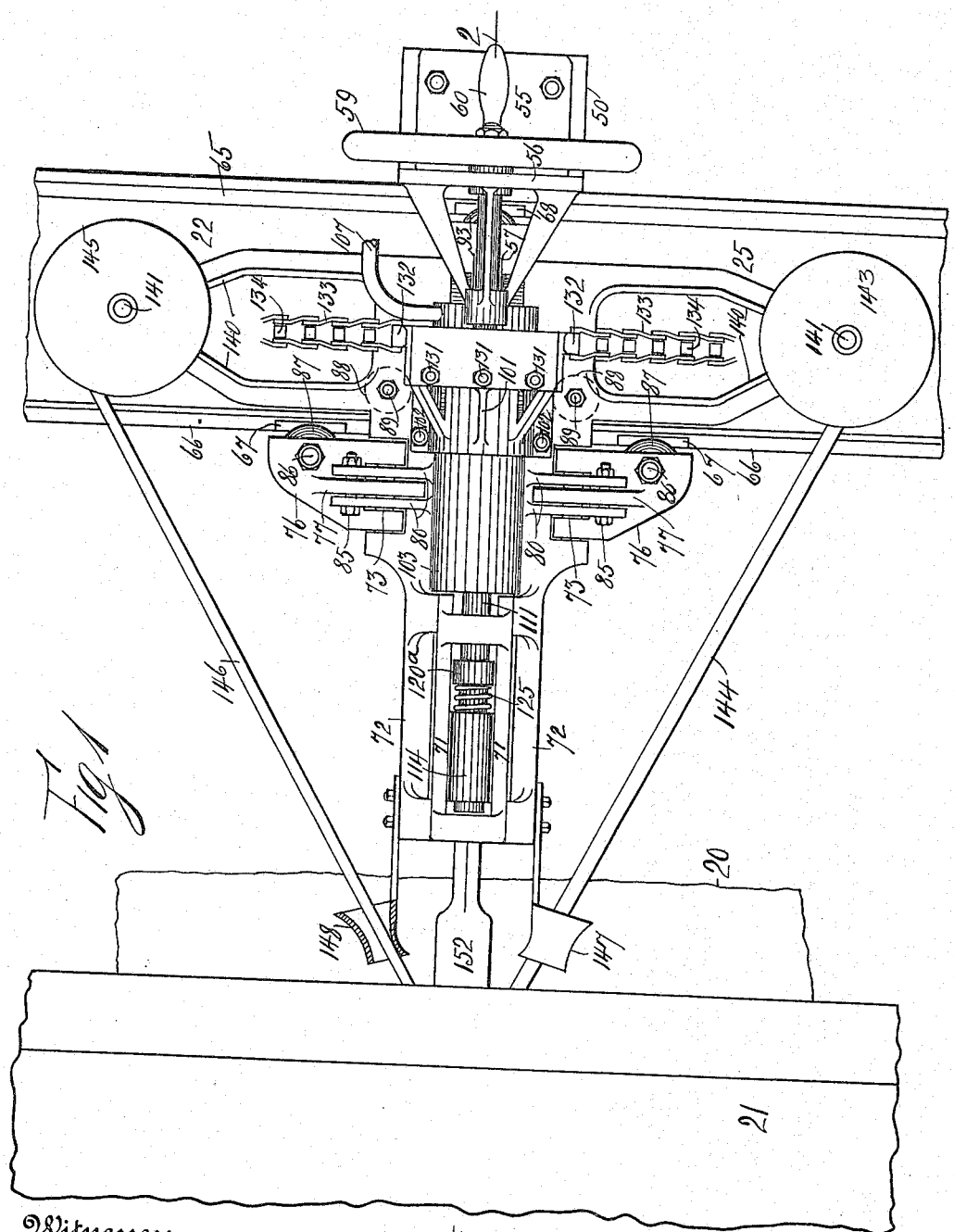

C. J. GEFVERT.
PIPE CALKING MACHINE.
APPLICATION FILED MAY 6, 1913.

1,129,191.

Patented Feb. 23, 1915.
5 SHEETS—SHEET 1.

Witnesses:
T. A. Elliott
Harriet Hillman

Inventor
Charles J. Gefvert
By his Attorney
A. Ade Bonneville

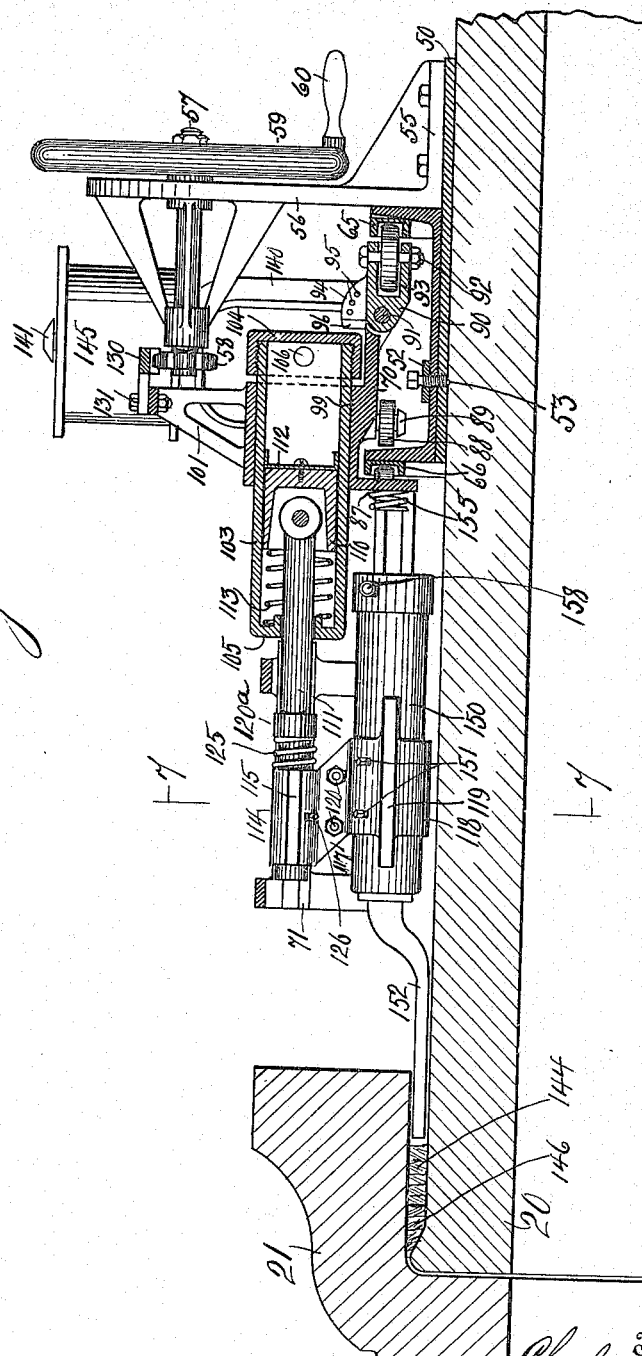

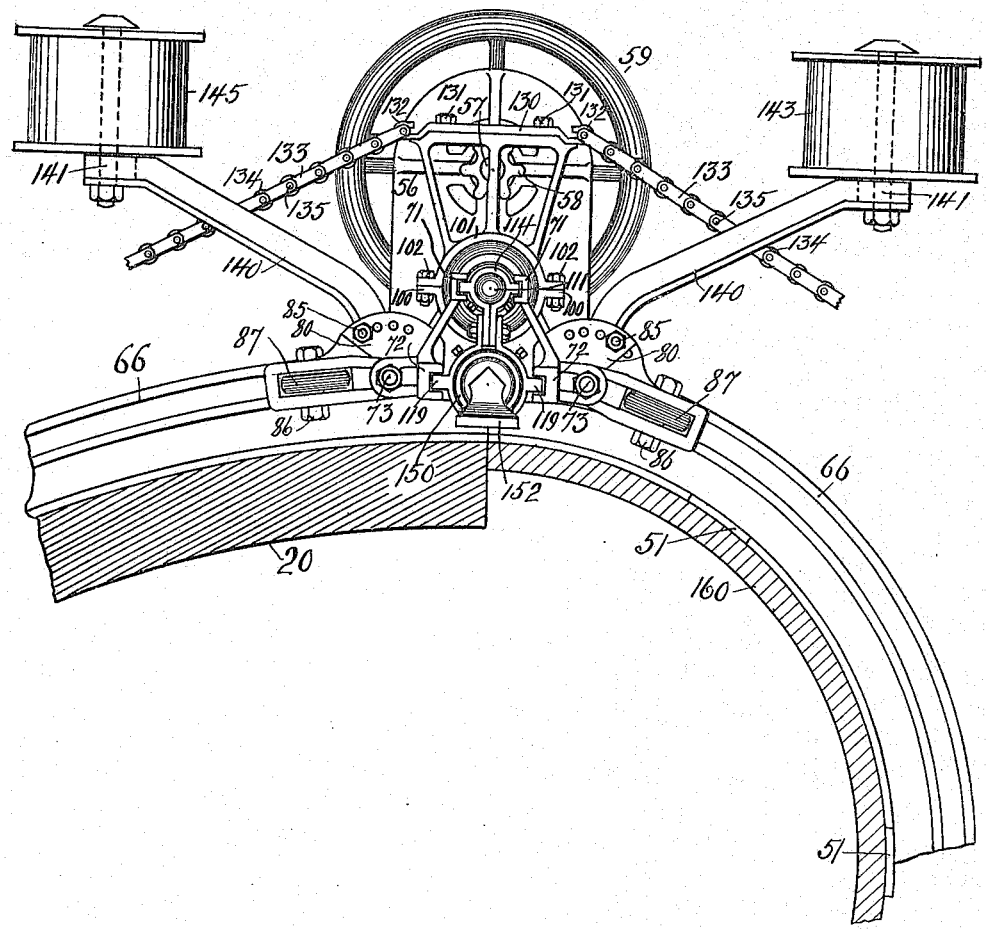

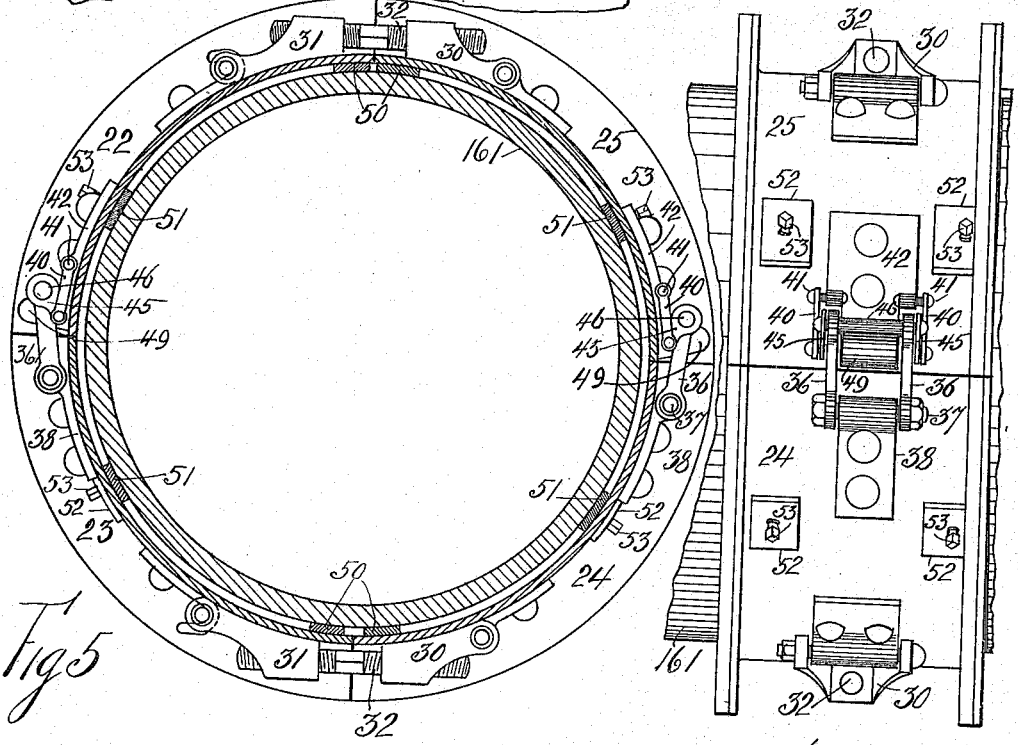

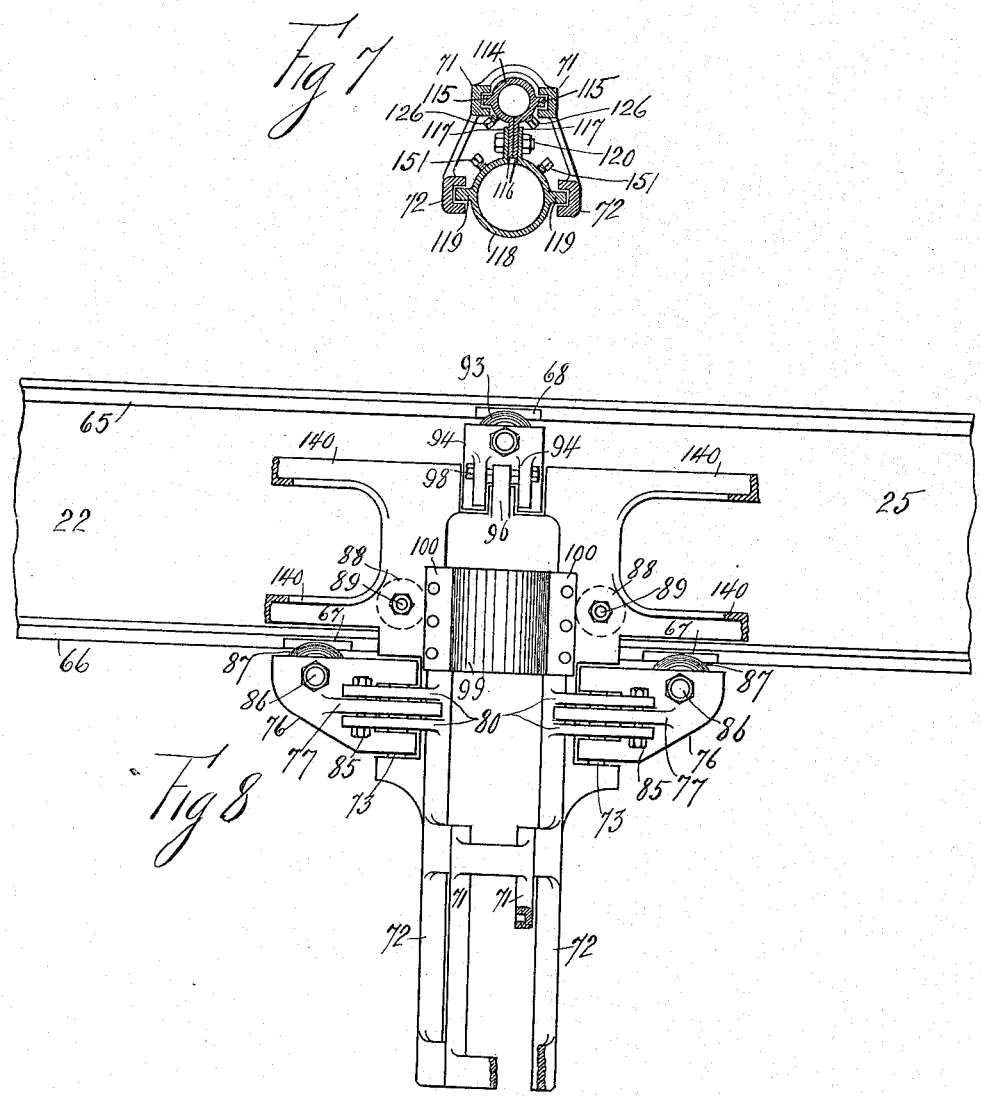

UNITED STATES PATENT OFFICE.

CHARLES J. GEFVERT, OF NEW YORK, N. Y.

PIPE-CALKING MACHINE.

1,129,191.　　　Specification of Letters Patent.　　Patented Feb. 23, 1915.

Application filed May 6, 1913.　Serial No. 765,837.

*To all whom it may concern:*

Be it known that I, CHARLES J. GEFVERT, a citizen of the United States, and resident of the borough of Bronx, in the county of Bronx and State of New York, have invented certain new and useful Improvements in Pipe-Calking Machines, of which the following is a specification.

This invention relates to pipe calking machines. Its object is the production of a machine which can easily be placed in operative position around the cylindrical surface of piping and the like, to calk the joints thereof. Means are provided to connect the machine with piping of different diameters and to tilt the machine during its operation to effectively calk the joints of the piping.

In the accompanying drawings Figure 1 represents a top plan view of a machine exemplifying the invention in operative position on piping with a bell and spigot joint, Fig. 2 shows an elevation and partial section of Fig. 1, on the line 2, 2, Fig. 3 is a left hand side view of Fig. 1, showing the machine in two operative positions on two diameters of piping in section, Fig. 4 represents a top plan view of a fragmentary portion of the track for the machine with a fragmentary portion of piping, Fig. 5 shows a section of Fig. 4 on the line 5, 5, Fig. 6 represents a right hand view of a figure like Fig. 5 when not sectioned, Fig. 7 shows a partial section of Fig. 2 on the line 7, 7, and Fig. 8 represents a fragmentary top plan view of the truck frame of the machine with some details.

The spigot end of a length of piping is shown at 20 in place with the bell 21 of an accompanying length of piping.

A track comprises four quadrants 22, 23, 24, 25 of channel irons. The quadrants 24 and 25 carry each a hinged turn-buckle member 30, and the quadrants 22, 23 carry each a hooked turn-buckle member 31. Each member 30 is connected to its accompanying member 31 by the right and left handed screw 32. The pair of quadrants 22, 23 and 24, 25 are connected by a linked locking device, each of which comprises a pair of links 36, fulcrumed on a pin 37 extending from brackets 38 fastened respectively to the quadrants 23, 24. A pair of links 40 are hinged on pins 41 extending from brackets 42 fastened respectively to the quadrants 22, 25. A link 45 connects each of the links 36 and 40, and a pin 46 connects the links 36 and 45. A nose 49 extends from the bracket 42 and the pin 46 locks therewith, when the quadrants are in position on the piping. The screws 32 serve to take up lost motion between the track and the piping.

Separators 50 and 51 are riveted to the inner faces of the quadrants. Reinforcing strips 52 are fastened to the quadrants and set screws 53 extend through the strips 52, the quadrants and the separators 51 to pinch the piping. One pair of the separators 50 extend beyond one of the quadrants and supports the foot 55 of a bracket 56. A spindle 57 is journaled in the bracket 56 and which has fastened at one end thereof the sprocket chain wheel 58, and at the other end the balance wheel 59 with the operating handle 60. To the quadrants 22, 23, 24, 25 are fastened on the inside faces of the flanges thereof, the guide channel portions 65. On the outside faces of the opposite flanges of the said quadrants are fastened the guide channel portions 66. Notches 67 and 68 are respectively formed in the channel portions 66 and 65, to permit the movable portion of the machine to be located in operative position.

A truck frame 70 has formed with its front end a pair of upper guides 71, and a pair of lower guides 72. The said frame has adjustably pivoted thereto by means of the pins 73, the front journal box frames 76, that have each formed therewith a rib 77. Pairs of ribs 80 are formed at opposite sides of the truck frame and straddle their accompanying ribs 77 so that bolts 85 can connect a perforation in the ribs 77 with perforations in their accompanying ribs 80, to enable the box frames 76 to be tilted in different operative positions for different diameters of piping. In each journal box frame 76 is located a pivot bolt 86, on which is journaled a guide roller 87 that engages the channel portions 66. Guide rollers 88 are journaled on pivots 89 extending from the rear portion of the truck frame 70, and can bear against the inner surface of one of the flanges of the quadrants 22, 23, 24, 25 of the track. To the truck frame 70 is also adjustably pivoted the rear journal box frame 90, by means of a pivot 91. The frame 90 carries a pivot bolt 92, on which is journaled the rear guide roller 93, that registers with the guide channel portions 65.

A pair of ribs 94 having a plurality of perforations 95 extend from the truck frame 90, and a rib 96 with a perforation extends from the truck frame 70. A bolt 98 connects the perforation 95 with the perforations in the rib 96, to locate the guide roller 93 in different positions. With the truck frame 70 is formed the cylindrical seat 99 with the flanges 100. A bracket 101 is supported on the flanges 100 and secured by bolts 102. An adjusting air cylinder 103 with the heads 104, 105, and the air inlet port 106 is located upon the seat 99, and held in place by the bracket 101. An air inlet pipe 107 with a three way cock not shown leads to the port 106. A piston 110 in the cylinder 103 has pinned thereto the piston rod 111 that is guided in the head 105. A cup leather packing 112 is fastened to the piston 110. A spring 113 bears between the head 105 and the piston 110. The piston rod 111 carries a spring bracket with the eye 114 having the guide flanges 115 and legs 116. The latter are connected to the legs 117 of a second spring bracket having the eye 118 with the guide flanges 119. Bolts 120 connect the legs 116 and 117. The flanges 115 register with the upper guides 71 of the truck frame 70, and the flanges 119 register with the lower guide 72 thereof. A collar 120ª is formed with the piston rod 111. A spring 125 encircles the rod 111 and bears between the collar 120ª and eye 114. Set screws 126 are in threaded engagement with the eye 114 and pinch the rod 111.

Upon the bracket 101 is fastened a rack 130 by means of the bolts 131. The ends of said rack have formed therewith the eyes 132, that engage a linked chain with the links 133 and rollers 134, that are joined with said links by means of the pins 135. The pitch of the rack and chain are the same, and register with the sprocket chain wheel 58, and with the rotations of the said wheel, the rotative portions of the machine are revolved around the piping, the chain extending around the latter. Legs 140 extend from the rear portion of the truck frame 70 and support pivots 141 on which are journaled, the spool 143 for lead-wool 144, and the spool 145 for yarn 146. Guide funnels 147, 148 extend from the front end of the frame 70.

An automatic calking tool 150 is clamped in the eye 118 and set screws 151 in threaded engagement with said eye pinch the calking tool. The tool 150 carries the reciprocating calking chisel 152 that enters the clearance space between the spigot 20 and the bell 21 of the piping. The valve gear of the tool 150 is not shown. A spring 155 is supported on the frame 70 and provides a buffer for the calking tool 152. An inlet 158 is connected with a tube not shown to furnish the tool 150 with its air or other operating fluid.

To show the adaptability of the machine to various diameters of piping, large piping 20 is shown in Figs. 1, 2 and part of Fig. 3, a fragmentary portion 160 of smaller piping is represented in part of Fig. 3 and piping 161 of still smaller diameter is shown in Figs. 4, 5 and 6.

To operate the machine the track comprising the quadrants 22, 23, 24, 25 is located in position around the piping, locking the pin 46 with the nose 49 and taking up lost motion by means of the screws 32. The chain having the links 133 is brought around the piping with the ends thereof engaged by the eyes 132 of the rack 130. The adjusting air cylinder 103 is placed in proper operative position on its seat 99 and held in place by the bracket 101, while the guide flanges 115, 119 respectively register with the guides 71 and 72. The end of the yarn 146 is drawn from the spool 145 and brought against the outer edge of the calking chisel 152. The operator by means of air from the air inlet pipe 107 moves the piston 110 in a position to locate the calking tool 150 in proper position, to press the yarn 146 into the annular chamber between the bell and spigot end of the piping to be calked. While the chisel 152 is reciprocating the operator, by means of the handle 60 and the intervening elements turns the sprocket chain wheel 58, which revolves the truck frame 70, air cylinder 103, automatic calking tool 150 and their appurtenances around the piping. The combined reciprocations of the chisel 152 and the revolutions thereof around the piping locate the yarn in proper position between the spigot end and bell of the piping. The operator next pulls the end of the lead wool 144 from the spool 143 and locates it in place in a manner similar to that described for the yarn, when the calking will be completed, the piston 110 being moved the requisite distance toward the cylinder head 104, so that the chisel 152 when reciprocating will force the lead wool in place. To adjust the machine for different diameters of piping the guide rollers 87 are placed in different operative positions, by locating the bolts 85 in the requisite openings in the ribs 77 and 80. To vary the angle of the chisel 152, the bolt 98 is placed in the different openings of the ribs 94 and 96. By locating the piston 110 of the cylinder 103 in different positions enables the chisel 152 to reciprocate in different positions in the annular space at the joint between the bell and spigot ends of the piping.

Having described my invention what I desire to secure by Letters Patent and claim is:

1. In a calking machine the combination of a track, a truck frame guided on said track, an adjusting cylinder carried on the frame, and a calking tool coacting with said cylinder.

2. In a calking machine the combination of a track to encircle an object, a truck frame on said track, a calking tool for the machine, a reciprocating chisel for said tool and means to locate said calking tool in different positions along its longitudinal axial center to axially vary the locations of the strokes of said chisel.

3. In a calking machine the combination of a track, comprising detachable portions, means to lock the portions together, a truck frame guided on said track, an adjusting cylinder carried on the frame, a piston for the cylinder actuated by a fluid, guides on the truck frame, a calking tool supported on said guides, and connections between the adjusting cylinder and the calking tool.

4. In a calking machine the combination of a track to engage piping, a truck frame guided on said track, means to drive the truck frame on said track, an adjusting cylinder carried on the frame, a piston for the cylinder, means to move the piston, a calking tool axially and movably supported on the frame and connections between said piston and said tool.

5. In a calking machine the combination of a track, a rotative wheel adjacent to the track, a truck frame guided on the track, connecting means between the wheel and truck frame to move the latter, a calking tool movably supported on the truck frame, a reciprocating chisel for the calking tool and means to move the calking tool to different positions along its longitudinal axial center to axially vary the locations of the strokes of said chisel.

6. In a calking machine the combination of a track, a spindle journaled over the track, a sprocket chain wheel fastened to the spindle, a truck frame guided on the track, a chain interposed between the truck frame and sprocket chain wheel to be driven by the rotations of said wheel, a calking tool movably supported on the truck frame, a reciprocating chisel for said tool and means to move the said tool to different positions along its longitudinal axial center to axially vary the locations of the strokes of said chisel.

7. In a calking machine the combination of a track, a bracket fastened to the track, a spindle journaled in the bracket, a sprocket chain wheel fastened to the spindle, a truck frame guided on the track, a bracket carried on the truck frame, a rack carried on the latter bracket to mesh with the sprocket chain wheel, a chain with its ends fastened to the ends of the rack and of a pitch to mesh with said sprocket chain wheel, a calking tool carried on the truck frame, means to actuate the calking tool and means to rotate the spindle with the sprocket chain wheel.

8. In a calking machine the combination of a track, a truck frame guided on the track, an adjusting cylinder supported on the truck frame, a piston for the cylinder, a calking tool adjustably supported on the frame, connections between the piston and calking tool, a calking chisel for the tool and a spool for calking material carried on the frame, the said material unwound from the spool with the reciprocations of the chisel.

9. In a calking machine the combination of an annular round track, a truck frame over the track, rollers journaled on the frame engaging said track, a pair of journal box frames adjustably connected to the frame, rollers journaled in the box frames engaging the track to adjust them to tracks of different diameters, a calking tool movably supported on the truck frame and a reciprocating chisel for said tool.

10. In a calking machine the combination of an annular round track, a truck frame over the track, rollers for the truck engaging said track, a journal box frame pivoted to the frame, a roller for the box frame engaging the track, means to adjust the box frame relatively to the truck frame to tilt the truck frame, a calking tool adjustably carried by the truck frame and means to locate the calking tool in different positions.

11. In a calking machine the combination of a track for piping and the like, a truck frame over the track, rollers journaled on the track frame guided by the track, a pair of spools for calking material on the truck frame, means to revolve the truck frame around the track, and a calking tool carried by the said frame.

12. In a calking machine the combination of a round annular track, a truck frame over the track, rollers journaled in the frame engaging said track, journal box frames pivoted to the truck frame, a rib having perforations formed with each journal box frame, ribs having perforations on the truck frame coacting with the ribs of the journal box frames, bolts connecting any perforation of the ribs of the journal box frames with the ribs of the truck frame to locate the journal box frames in different positions for different diameters of piping, and a calking tool carried on the truck frame.

13. In a calking machine the combination of a track for piping to be calked, a truck frame over the track, rollers connecting the truck frame and track, means to revolve the truck frame around the path of the track, means to adjust the truck frame for different diameters of piping, means to tilt the truck frame, and a calking tool movably supported on the truck frame.

Signed at the borough of Manhattan in the county of New York and State of New York, this 29th day of April A. D. 1913.

CHARLES J. GEFVERT.

Witnesses:
CHARLES T. COE,
A. A. DE BONNEVILLE.

Copies of this patent may be obtained for five cents each, by addressing the "Commissioner of Patents, Washington, D. C."